United States Patent
Cambonie

(10) Patent No.: US 6,324,561 B1
(45) Date of Patent: Nov. 27, 2001

(54) PROCESS AND DEVICE FOR COMPUTING A FOURIER TRANSFORM HAVING A "PIPELINED" ARCHITECTURE

(75) Inventor: Joel Cambonie, La Combe de Lancey (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/215,082

(22) Filed: Dec. 18, 1998

(30) Foreign Application Priority Data

Dec. 19, 1997 (FR) .................................................. 97 16116

(51) Int. Cl.[7] .................................................. G06F 17/14
(52) U.S. Cl. ............................................ 708/408; 708/406
(58) Field of Search .................................. 708/408, 409, 708/406

(56) References Cited

U.S. PATENT DOCUMENTS

| 4,689,762 | * | 8/1987 | Thibodeau, Jr. | 708/408 |
| 5,091,875 | * | 2/1992 | Wong et al. | 708/408 |
| 5,313,413 | * | 5/1994 | Bhartia et al. | 708/408 |
| 6,098,088 | * | 8/2000 | He et al. | 708/408 |

OTHER PUBLICATIONS

Basoglu, C et al., "An efficient FFT algorithm for superscalar and VLIW processor architectures", Real–Time Imaging, Dec. 1997, Academic press, , UK, vol. 3, No. 6, pp. 441–453.

Blair , G.M., "A review of the discrete Fourier transform, Part 2. Non–radix algorithms, real transforms and noise", Electronics & Communication Engineering Journal, Oct. 1995, UK, vol. 7, No. 5, pp. 187–194.

Hui, C.C.W. et al., "A 64–Point Fourier Transform Chip For Video Motion Compensation Using Phase Correlation", IEEE Journal of Solid–State Circuits, vol. 31, No. 11, Nov. 1996, pp. 1751–1761.

Swartzlander, E.E. Jr. et al., "A radix 4 delay commutator for fast Fourier transform processor implementation", IEEE Journal Of Solid–State Circuits, Oct. 1984, USA, vol. SC–19, No. 5, pp. 702–709.

* cited by examiner

*Primary Examiner*—David H. Malzahn
(74) *Attorney, Agent, or Firm*—Lisa K. Jorgenson; Allen, Dyer, Doppelt, Milbrath & Gilchrist, P.A.

(57) ABSTRACT

For each input block of N data bits received as an input to a stage for computing a Fourier transform, only three quarters of the data bits of the input block are stored in a main storage. A Fourier transform computation is performed on the basis of the stored data and of the other data of the block. Only half of the data bits received are stored in an auxiliary storage. All the data bits of the input block are reconstructed from the contents of the main and auxiliary storage to obtain a reconstructed data block, which is temporally delayed with respect to the input block.

21 Claims, 8 Drawing Sheets

FIG.4b
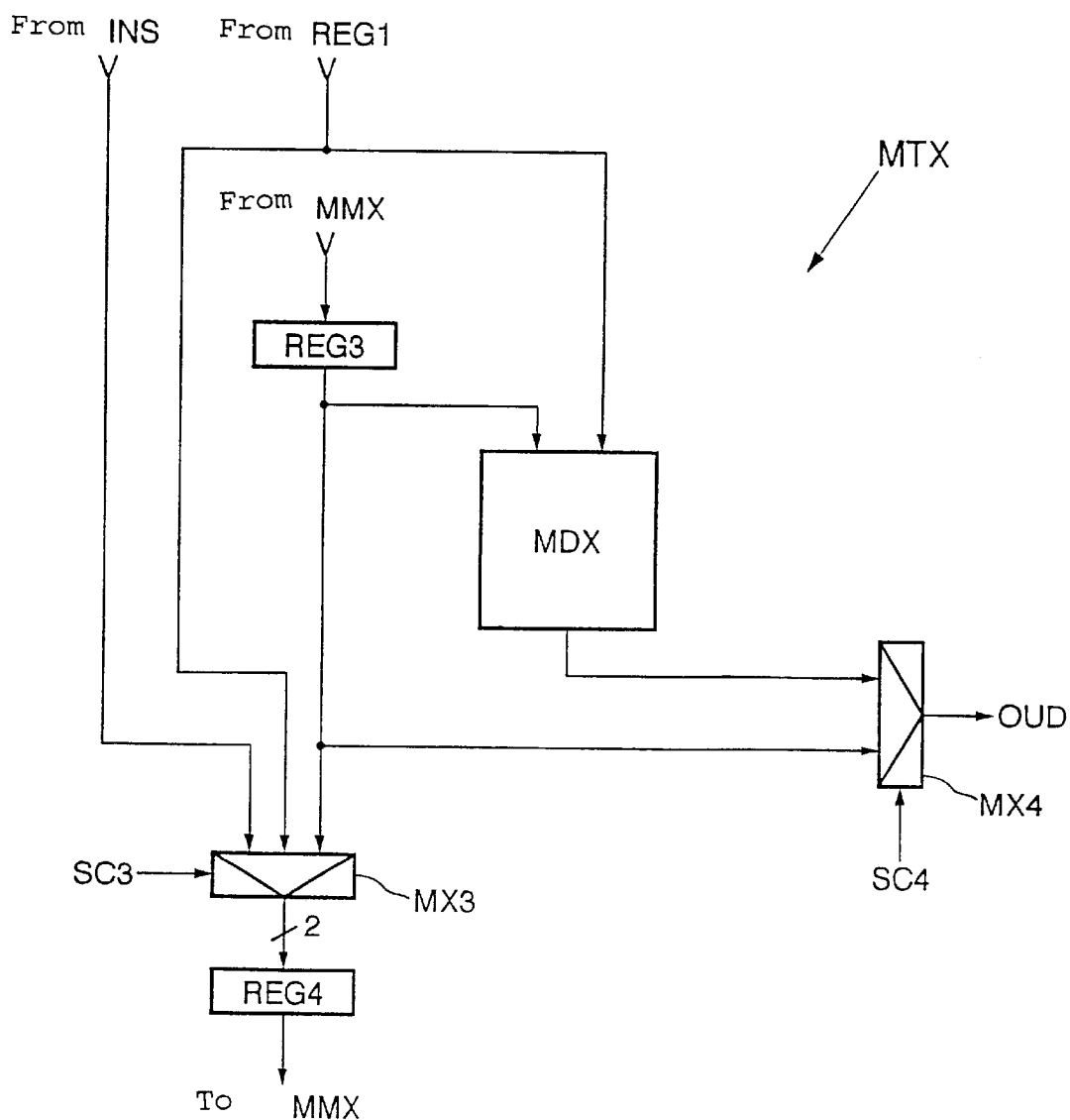
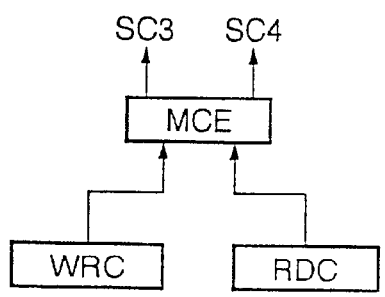

PROCESS AND DEVICE FOR COMPUTING A FOURIER TRANSFORM HAVING A "PIPELINED" ARCHITECTURE

FIELD OF THE INVENTION

The invention relates to the field of electronic computing devices, and, more particularly, At to an electronic device having a pipelined architecture for computing a Fourier transform, and a related method.

BACKGROUND OF THE INVENTION

Numerous dedicated Fourier transform implementations, including those programmed on signal processing microprocessors, have been disclosed. Most of these implementations use a variation of the Cooley-Turkey algorithm, which makes it possible to reduce the number of arithmetic operations required for computing the Fourier transform. This algorithm is well known to one skilled in the art.

In particular, the Cooley-Tukey algorithm reduces the computation of a fast Fourier transform of initial size $r^P$ into that of r Fourier transforms of size $r^{P-1}$, and of supplementary complex multiplications and additions. According to the terminology customarily used by one skilled in the art, r represents the radix. Iterative repetition of this reduction produces the computation of Fourier transforms of size r. These computations can easily be carried out, especially if r is chosen equal to 2 or 4. The Cooley-Tukey algorithm uses a computation graph that takes on the appearance of a structure of a general butterfly shape, and is commonly referred to simply as a butterfly. This appearance is well known to one skilled in the art.

Several hardware architectures are possible for implementing a butterfly-shaped computation structure. A first approach includes a hardware operator capable of performing a butterfly type computation per butterfly of the graph. However, such an approach may be used only for the implementation of Fourier transforms of small size.

A second approach includes just a single hardware operator of the butterfly type, and intending to perform in succession the computations corresponding to all the butterflies of all the stages of the graph. Such an approach has the drawback of requiring a very fast hardware operator. An input memory separate from the memory is required for writing the intermediate computation results. This avoids access conflicts when a data block enters the operator while the previous block is still being processed. It is therefore necessary to provide two memories of N0 complex words, where N0 denotes the initial size of the Fourier transform. This leads to an overall circuit of considerable size, especially when N0 is large.

An intermediate approach includes a hardware operator of the butterfly type per stage of the graph, as well as a storage element. This includes delay lines or shift registers, whose function in to input the data to the operator in the right order, while aware of the butterflies of the graph of the relevant stage. Such architectures are termed serial or pipelined according to terminology well known by one skilled in the art.

More precisely, an electronic device for computing a Fourier transform having a pipelined architecture comprises a plurality of successive processing stages connected in series between the input and the output of the device by internal data paths. These stages respectively comprise processing means and storage means. The processing means performs processing operations for Fourier transforms of smaller elementary sizes than the initial size on blocks of data whose sizes are reduced in succession from one stage to the next.

The term "initial size" of the Fourier transform is understood here and in the remainder of the text to mean the size of the blocks received as input to the device by the first stage. The elementary sizes of the Fourier transforms performed by the various stages may be identical and equal to the radix of the Fourier transform; i.e., a Fourier transform with uniform radix. However, they may be different from one stage to another, as in the case of Fourier transforms with mixed radix.

Examples of pipelined architectures are described in an article by Bi and Jones, entitled "A Pipelined FFT Processor for Word-Sequential Data", IEEE Transactions on Acoustic Speech and Signal Processing, vol. 37, No. 12, December 1989, pages 1982–1985, and in an article by Bidget et al., entitled "A Fast Single-Chip Implementation of 8192 Complex Point FFT", IEEE Journal of Solid-State Circuits, vol. 30, No. 3, March 1995, pages 300–305.

The storage means described in these known architectures includes delay lines which are very simple elements to manage. They have the advantage of being generally compact, and use three transistors per stored bit. However, these elements are not always available as standard cells in ordinary libraries of components used in defining and designing integrated circuits. Furthermore, their electrical characteristics are dependent on the technology used, so that the architecture of the circuit must be carefully re-examined each time the technology advances. Such architectures use delay lines whose storage capacity per radix 4 stage is equal to 3N/2, where N is the size of the blocks processed by the stage. The architecture with delay lines, with a per-stage storage capacity equal to 3N/2, allows for processing of Fourier transforms on each symbol, while also delivering data temporally delayed by the length of a symbol, thus enabling the desired correlation to be performed.

In certain applications, especially in terrestrial applications of digital television using OFDM (Orthogonal Frequency Division Multiplex) coding for transmission, the various symbols to be processed by Fourier transforms are separated by a guard interval. More precisely, in an OFDM application, each symbol received is preceded by a guard interval which is identical to the terminal part of the symbol. In this kind of application, it is then particularly advantageous to use this property to detect the temporal position of the various symbols in the incoming flow, and thereby monitor the proper temporal synchronization of these various symbols. In this regard, a correlation of the incoming flow with the last symbol received, and its associated guard interval is generally performed. This additionally requires, in particular, the storage of a complete symbol.

SUMMARY OF THE INVENTION

The invention provides a different approach to the above described problem with respect to the memory size required for the storage of each last symbol received. An object of the invention is to provide a radix 4 processing stage for a device for computing a Fourier transform. The device includes a pipelined architecture capable of operating with very high clock frequencies, and for storing each last symbol received. The process is performed while minimizing the memory size required, while using conventional and readily available storage elements, regardless of the implemented technology.

Another object of the invention is to provide a radix 4 processing stage capable of easily being tested with full scan test methods, which are well known to one skilled in the art. Yet another object of the invention is to take account of any guard interval separating the various symbols to be processed by Fourier transform, especially in terrestrial applications of digital television which use OFDM (Orthogonal Frequency Division Multiplex) coding for transmission. This is done so even if the length of this guard interval is not known a priori.

The invention therefore provides a process for controlling a radix 4 processing stage of an electronic device for computing a Fourier transform, wherein the electronic device has a pipelined architecture. An electronic computing device having a pipelined architecture comprises a plurality of successive processing stages connected in series between the input and the output of the device. These stages respectively comprises processing means and storage means. The processing means performs processing operations for Fourier transforms of smaller elementary sizes than the initial size on blocks of data whose sizes are reduced in succession from one stage to the next. A radix 4 processing stage includes processing means which performs processing operations for Fourier transforms of elementary size equal to 4 on each block of data received as an input to the stage.

For each block of N data bits received as an input to the stage, only three quarters of the data of the block are stored in the main storage. The main storage comprises a random access main memory, and in particular, a single-access static memory. A Fourier transform computation is performed on the basis of the stored data and of the other data of the block. Furthermore, only half of the data received are stored in an auxiliary storage. The auxiliary storage comprises a random access auxiliary memory, e.g., a single-access static memory. All the data of the input blocks are reconstructed from the contents of the main and auxiliary storage to obtain a reconstructed data block that is temporally delayed with respect to the input block. It will subsequently be possible to perform a sliding correlation between the output of the radix 4 stage delivering the temporally delayed data and the input data.

The use of random access memories, whether dual-access (dual port) or single-access (single port), requires specific management for addressing so the intermediate data in memory can be stored and redelivered in the right order. The single access permits either write-access or read-access at each cycle of the internal clock of the device. The specific management is more complex when the radix of the Fourier transform is greater than 2, and in particular, when it is equal to 4. This approach goes against all current teachings on the subject, which provides for the use of delay lines or shift registers.

The use of random access memories enables the storage capacity of the stage to be reduced relative to the storage capacity required when using delay lines. Such components are readily available, particularly in their simplest form, i.e., a single-access static memory. Random access memories are totally independent of the technology used, and are compatible with very high clock frequencies.

Thus, according to the invention, in a radix 4 processing stage, the storage capacity required to perform the Fourier transform computations is equal to 3N/4 data bits. There is therefore a saving of a factor 2 in storage capacity relative to the prior art approach, which provides for the use of delay lines. Furthermore, the invention provides for the addition of extra storage capacity of only N/2 data bits (half a symbol) for the reconstruction of the N data bite of a symbol. When computing the Fourier transform of a block of N data bits, all the data stored in the main memory (3N/4 data bits) are replaced by intermediate computation data as the remaining N/4 data of the input block are received. The total storage capacity of the stage is therefore equal to 5N/4, this being lower than that (3N/2) of a delay line stage according to the prior art.

According to one embodiment of the process according to the invention, the stage sequentially receives the N data bits of the block. The data is ordered within four consecutive segments, each containing N/4 data bits. Each datum of a segment a forms, together with the counterpart data of the other three segments, a group of four data bits. The data contained in the first three segments are stored in the main storage means as they are received. As the data contained in the fourth segment are received, the data contained in the third segment (which are stored in the main storage) are stored in the auxiliary storage, as well as storing the data contained in the fourth segment. A processing operation of the butterfly type is performed on each of the groups to derive successive groups of four intermediate data ordered respectively within four consecutive intermediate segments. In addition, the data stored in the main storage means are replaced respectively by the intermediate data contained in the last three intermediate segments. The input data contained in the first two segments are advantageously reconstructed by recomputing them. The data contained in the last two segments are reconstructed by storing temporarily in the auxiliary storage means before removing therefrom.

In another embodiment of the process, in which two successive input blocks are separated by a guard interval, all the data of the guard interval are stored in succession in the main memory as the data of the guard interval are received. Successive shifts of the storage locations of the data of the guard interval are subsequently performed. They are then extracted in succession from the main storage to store in succession in the auxiliary storage before removing them therefrom in succession. This is done to retrieve a temporally delayed guard interval separating the two successive reconstructed blocks temporally delayed with respect to the two input blocks. The successive shifts of the storage locations of the data of the guard interval and the storing in the auxiliary storage are performed as the data contained in the first three segments of the input block are received.

Another embodiment of the invention is an electronic device for computing a Fourier transform having a pipelined architecture. The electronic device comprises at least one processing stage with radix equal to 4 that is able to receive as input successive blocks of N data bits. This processing stage with radix equal to 4 comprises a main storage having a storage capacity equal to 3N/4 data bits, which includes a random access main memory. The stage also comprises an auxiliary storage having a storage capacity equal to N/2 data bits, which included a random access auxiliary memory. This stage also comprises main processing means for performing processing operations for Fourier transforms of elementary size equal to 4 on each input block. This is performed on the basis of the contents of the main storage and of N/4 other data bits of the block. The stage also comprises auxiliary processing means which reconstructs all the data of the input block from the contents of the main and auxiliary storage to obtain a reconstructed data block temporally delayed with respect to the input block.

According to another embodiment of the invention, the main processing means of the radix 4 stage respectively performs N/4 processing operations of the butterfly type on N/4 distinct groups of four data of each data block processed by this stage. The main storage comprises a random access main memory and n main registers mutually connected in series with the main memory. The main memory is able to store N/4−(n−1) words of three data bits, while each main register is able to store one word of three data bits. Likewise, the auxiliary storage comprises a random access auxiliary memory and n auxiliary registers mutually connected in series with the auxiliary memory. The auxiliary memory stores N/4−(n−1) words of two data bits, while each auxiliary register is able to store one word of two data bits.

Various internal hardware architectures of the main processing may be used for implementing the processing operations of the butterfly type within each stage. However, it is preferable for the main processing of the radix 4 stage respectively to perform N/4 processing operations of the butterfly type on N/4 distinct groups of four data bits of each data block processed by this stage, with N being the size of the block.

The main processing, according to the invention, makes provisions to call each datum (or operand) of the block received once only to perform the various processing operations of the butterfly type. This is distinguishable, in particular, from the hardware operator disclosed in the article by Bidget et al., as mentioned above. The hardware operator disclosed in Bidget et al, makes provisions to call each operand several times to perform the processing operations. The main processing of a radix 4 stage comprises eight complex adders and one multiplier, whereas the prior art with delay lines makes provision for only six adders and one multiplier. However, the main processing stores fewer intermediate data and contribute, in combination with the use of a random access memory, to further minimize the storage capacity of the stage.

Although it is possible to provide for the storage means of this stage to consist solely of random access memories, it is particularly advantageous to associate with each random access memory one or more levels of registers or latches which are mutually connected in series with the memory. This makes it possible to separate the memory proper from the operative part of the stage, and to use automatic tools for generating test vectors, These automatic teat methods are referred to as full scan methods, and are well known to one skilled in the art. These methods consist, in particular, in loading all the latches, performing computations, and then rewriting the data to the latches to carry out the tests.

According to yet another embodiment of the invention, the radix 4 processing stage comprises an input for sequentially receiving, at the frequency of a first clock signal ("symbol" clock), the N data bits of a current block. The data are ordered within four consecutive segments, each containing N/4 data bits. Each datum of a segment forms, together with the counterpart data of the other three segments, a group of four data bits. The main processing of the stage comprises an adder/subtractor module able to perform, at each cycle of the first clock signal, a processing operation of the butterfly type on each of the groups thus formed. This is done to derive successive groups of four intermediate data respectively ordered within four consecutive intermediate segments. The main processing furthermore comprises a multiplier module able to multiply, at each cycle of the first clock signal, the intermediate data by predetermined multiplier coefficients.

The processing stage also comprises a main control able to deliver to the main storage of this stage the data contained in the first three segments as they are received. The data contained in the last segment is not stored. As the data contained in the fourth segment are received, the main control is able to respectively replace the data stored in the main storage by the intermediate data contained in the last three intermediate segments.

The auxiliary processing comprises an auxiliary reconstruction module able to recompute the data of the input block contained in the first and second segments, and an auxiliary control. The auxiliary control is able to deliver to the auxiliary storage the data contained in the third segment and stored in the main storage, as well as the data contained in the fourth segment. The auxiliary control is also able to remove them therefrom in such a way as to reconstruct the data contained in the third and fourth segments.

According to another embodiment of the invention, the main storage of this stage comprises a first main register connected to the output of the main memory, and a second main register connected to the input of the main memory. The output of the first main register is connected, firstly, to the input of the second main register by a first controllable multiplexer. The output, secondly, is connected to the input of the adder/subtractor module, and thirdly, to the input of the multiplier module by a second controllable multiplexer. The output of the adder/subtractor module is connected to the input of the first main register by the first multiplexer, and the output is connected to the input of the multiplier module by the second multiplexer.

The auxiliary storage comprises a third auxiliary register connected to the output of the auxiliary memory, and a fourth auxiliary register connected to the input of the auxiliary memory. The output of the third auxiliary register is connected, firstly, to the input of the fourth auxiliary register by a third controllable multiplexer. This third controllable multiplexer is furthermore also input connected to the input terminal of the stage, as well as to the output of the first main register. The output of the third auxiliary register is connected, secondly, to the input of the auxiliary reconstruction module, and thirdly to the output for delivering the reconstructed and delayed data. This is done by a fourth controllable multiplexer. An input of the auxiliary module is furthermore connected to an output of the first main register, while the output of the auxiliary reconstruction module is connected to an input of the fourth multiplexer.

The main control and the auxiliary control comprises the four multiplexer, a first counter modulo N (write counter) clocked by the first clock signal and reinitialized on reception of the first datum of each block. Also included is a second counter modulo N (read counter) clocked by the first clock signal and reinitialized on transmission of the first output datum from the stage. This is done when the first counter modulo N reaches the value 3N/4. A control module delivers the control signals for the four multiplexers on the basis of the count values from the two counters. The main and auxiliary processing further comprise common means for addressing the main memory and the auxiliary memory comprising a counter modulo N/4−1, i.e., N4/−(n−1) with n=2 since there are two registers per memory.

When two successive input blocks are separated by a guard interval, the main processing advantageously comprises shift means for performing successive shifts of the storage locations of the data of the guard interval in the main memory. These shift means advantageously comprise the second multiplexer connected to the input of the main memory via the second main register.

BRIEF DESCRIPTION OF THE DRAWINGS

Other advantages and characteristics of the invention will emerge on examining modes of implementation and embodiments of the invention, which are in no way limiting, and on examining the appended drawings in which:

FIGS. 4a and 4b illustrate in greater detail the schematic representation of FIG. 3;

DETAILED DESCRIPTION OF THE PREFERRED EMBODIMENTS

Figure 1:
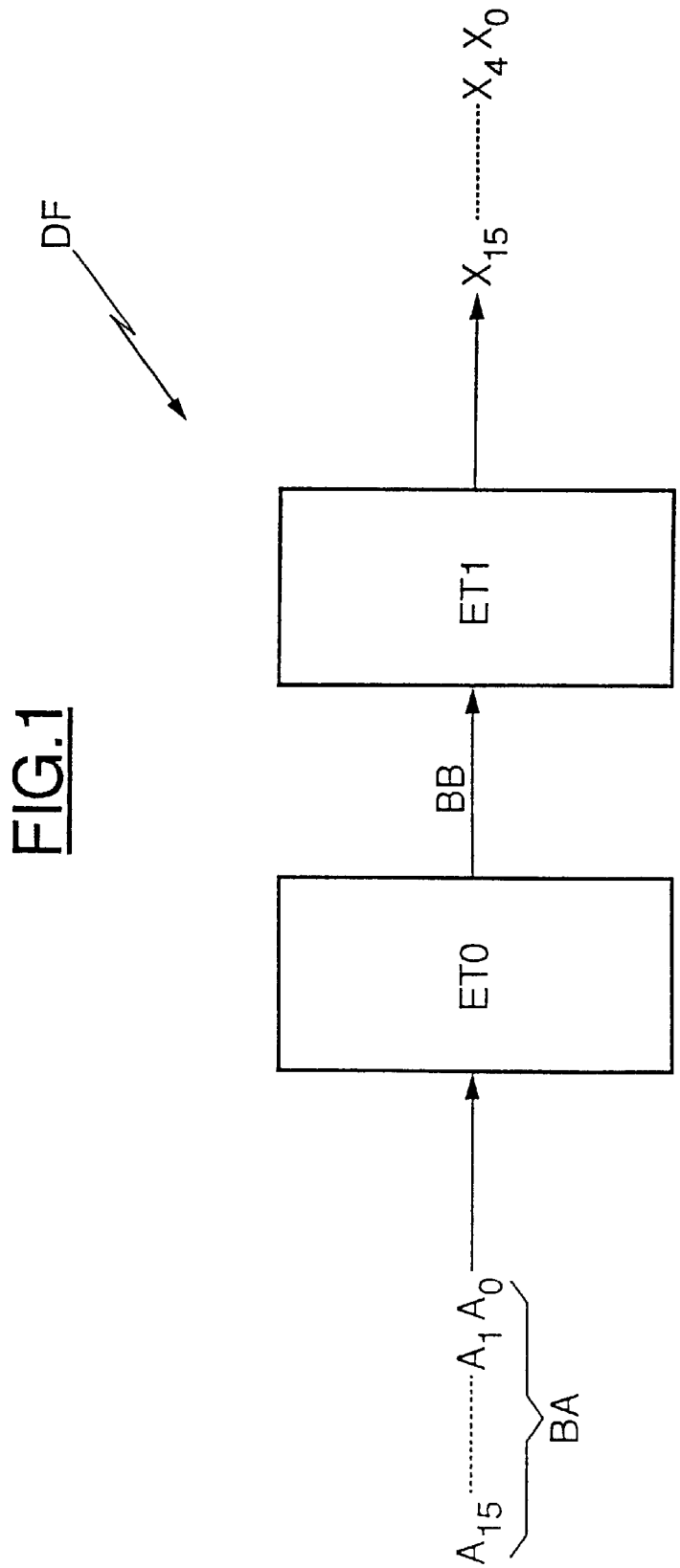
FIG. 1 is a schematic overview of a device with two processing stages, according to the present invention.

In FIG. 1, the reference DF denotes a device for computing a Fourier transform. The device has a pipelined architecture capable of performing a Fourier transform of initial size equal to 16, and comprises two radix 4 processing stages ET0 and ET1. The input stage ET0 receives streams of symbols or data blocks BA respectively comprising sixteen data $A_0$–$A_{15}$. The output of the stage ET0 delivers successive blocks BB of four data which are processed in the stage ET1. This stage ET1 delivers the output symbol $X_{15} \ldots X_4 X_0$ corresponding to the input symbol BA.

Generally, the size of the data block received as input is equal to N for a radix 4 processing stage. This data block can be split into four segments of N/4 data each, temporally received consecutively. The first segment is formed of the data $A_i^K$, the second segment is formed of the data $A_{N/4+i}^K$, the third segment is formed of the data $A_{N/2+i}^K$, and the fourth segment is formed of the data $A_{3N/4+i}^K$. In each data, i varies from 0 to N/4–1, and represents the a number of processing operations of the butterfly type performed in the stage on each data block received. K represents the $K^{th}$ block received by the stage.

Furthermore, one skilled in the art is aware that if s denotes the rank of the relevant stage, N is equal to $N0/4^s$, where N0 denotes the initial size of the Fourier transform, i.e., the size of each symbol received by the input stage. If the relevant stage is the first, the $K^{th}$ block corresponds to the $K^{th}$ symbol received. In contrast, if the relevant stage is not the first (rank s different from 0), each symbol input to the device is split up recursively within each stage into $4^s$ blocks K (K varying from 0 to $4^s$–1).

Figure 2:
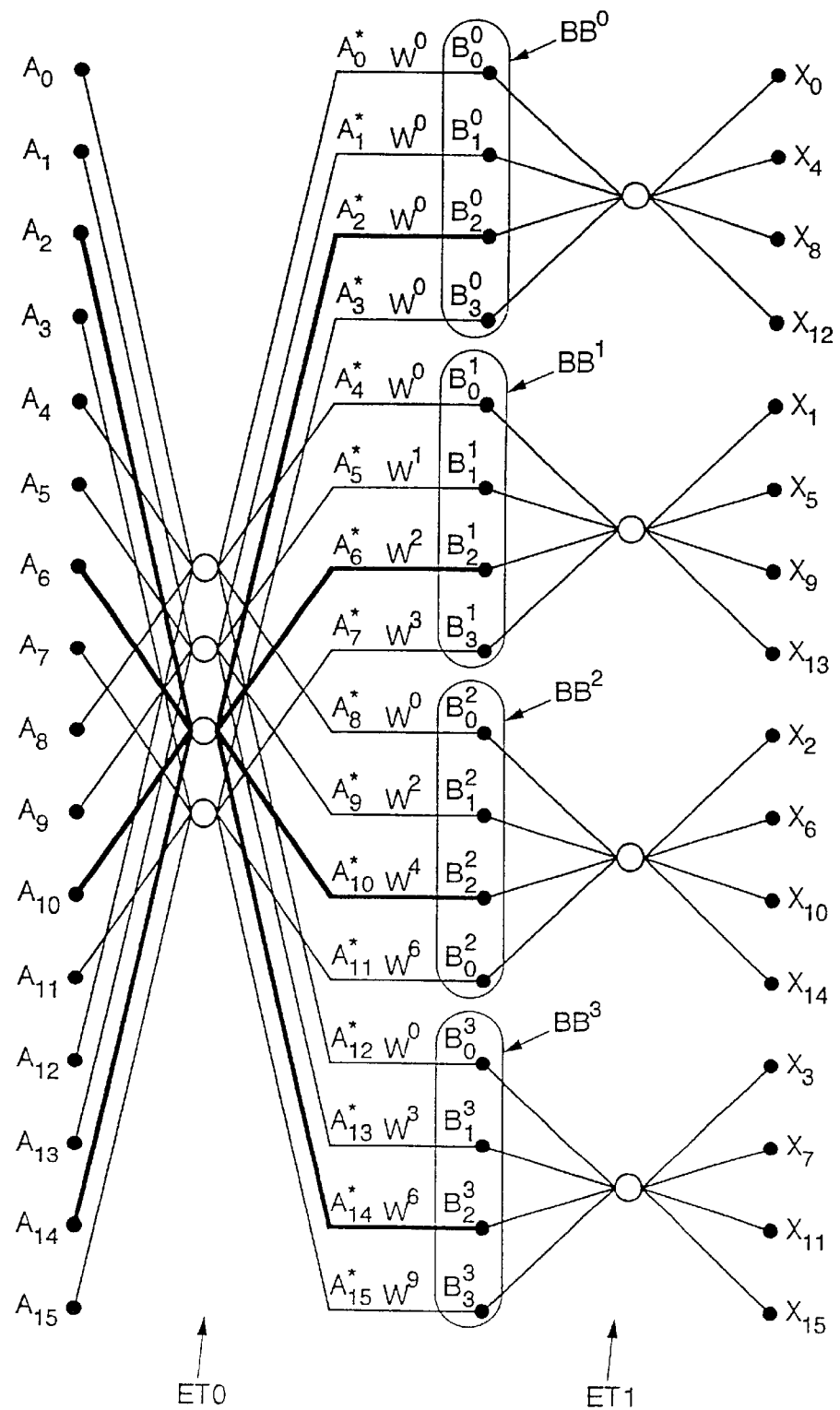
FIG. 2 illustrates butterfly type processing operations performed in the device of FIG. 1.

FIG. 2 illustrates the particular case of the sixteen data (N=16) of each block received by the stage ET0. The radix 4 processing stage then performs stage ET0. The radix 4 processing stage then performs N/4 processing operations of the butterfly type on N/4 distinct groups of four data bits formed respectively by a datum of the first segment and the counterpart data of the other three segments. The stage ET0 performs a first processing operation of a butterfly type on the group formed of the data bits $A_0$, $A_4$, $A_8$ and $A_{12}$, and a second processing operation of the butter-fly type is performed on a second group of data formed of the data bits $A_1$, $A_5$, $A_9$ and $A_{13}$, etc. This is continued up to a fourth processing operation of a butterfly type on the fourth group of data formed of the data bits $A_3$, $A_7$, $A_{11}$ and $A_{15}$.

The result of these processing operations of the butterfly type are intermediate data likewise ordered within four intermediate segments, each containing N/4 intermediate data bits. More precisely, the first intermediate segment contains the intermediate data bit $A_i^{K*}$, the second intermediate segment contains the intermediate data bit $A_{N/4+i}^{K*}$, the third intermediate segment contains the data bit $A_{N/2+i}^{K*}$, and the fourth intermediate segment contains the data bit $A_{3N/4+i}^{K*}$.

These intermediate data are obtained according to the following formulas (I) to (IV):

$$A_i^{K*} = A_i^K + A_{N/4+i}^K + A_{N/2+i}^K + A_{3N/4+i}^K \quad (I)$$

$$A_{N/4+i}^{K*} = A_i^K - A_{N/4+i}^K + A_{N/2+i}^K - A_{3N/4+i}^K \quad (II)$$

$$A_{N/2+i}^{K*} = A_i^K - j A_{N/4+i}^K - A_{N/2+i}^K + j A_{3N/4+i}^K \quad (III)$$

$$A_{3N/4+i}^{K*} = A_i^K - j A_{N/4+i}^K - A_{N/2+i}^K - j A_{3N/4+i}^K. \quad (IV)$$

In these formulas, j denotes the complex number whose square is equal to –1, and i varies from 0 to N/4–1. These intermediate data are next multiplied by coefficients are conventional complex coefficients well known to one skilled in the art. After multiplying by these coefficients W, four blocks $BB^{4K}$, $BB^{4K+1}$, $BB^{4K+2}$, $B_i^{4K+3}$ respectively containing N/4 output data, $B_i^{4K}$, $B_i^{4K+1}$, $B_i^{4K+2}$ and $B_i^{4K+3}$ are provided at the output of the processing stage, with i varying from 0 to N/4–1. All the blocks BB will then be processed consecutively by the main processing of the second stage ET1, each of these blocks being regarded as an input symbol for this second stage. Thus, in FIG. 2, the main processing means will perform in succession a butterfly type processing operation on the four data of each input block BB to obtain intermediate data B*. The output data, in the present case, is the result of the Fourier transform of the input data A.

Figure 3:
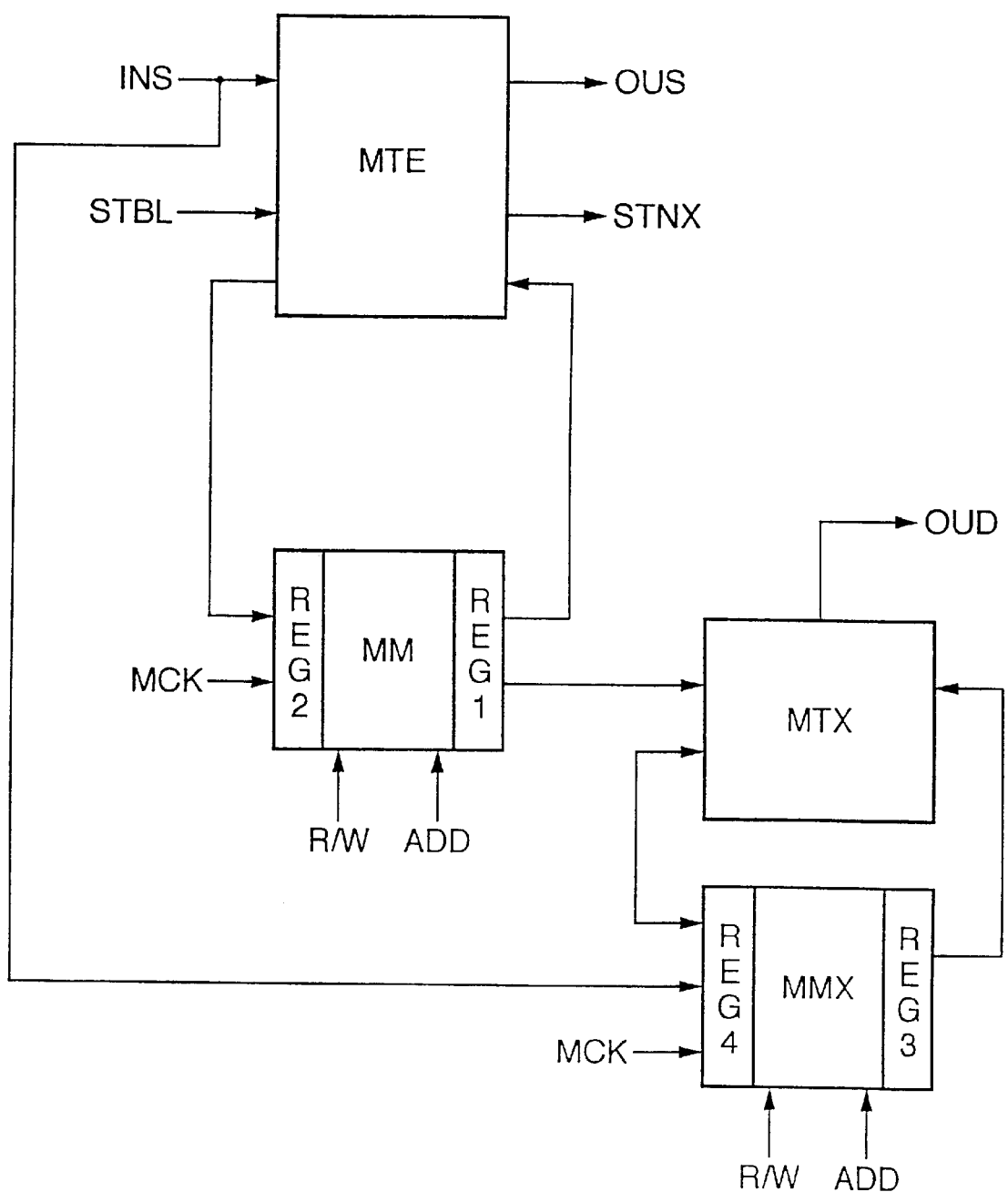
FIG. 3 is a schematic representation of the hardware architecture of a processing stage in the device of FIG. 1.

In FIG. 3, the reference MTE denotes the main processing means of a radix 4 processing stage of the device DF. The main processing means MTE comprises an input terminal for receiving the flow INS of the various data blocks originating either from exterior to the device if the relevant stage is the first, or from the previous stage. If the relevant stage is the first, the various blocks represent the various symbols on which the Fourier transform will be performed. The data contained in each of the blocks received are delivered at the frequency of a first clock signal SMCK. The main processing means MTE is clocked by a base clock signal MCK whose frequency is either twice as large as the frequency of the signal SMCK, or four Limes as large. The later is dependent on whether, during each cycle of the signal SMCK, the main processing means MTE receives either the real and/or imaginary part of each datum. The output data stream OUS (after Fourier transform processing) is delivered to an output terminal of this processing stage.

Furthermore, the main processing means MTE receives a first monitoring signal STBL originating either from outside the device if the relevant state is the first, or from the previous stage. This signal STBL indicates reception of the first datum of a block, for example, when it passes to the "1" state. Likewise, the main processing means MTE delivers a second monitoring Signal STNX to the following stage which indicates, for example, when it passes to the "1" state. Transmission of the first output datum arises from the processing of the input block. The signal STBL received by the current stage is then the signal STNX transmitted by the previous stage.

The radix 4 processing stage comprises main storage means comprising a single-access random access static main memory MM looped back to the main processing means MTE. The loop back is by a first main register or latch REG1 connected to the output of the main memory MM, and by a second main register or latch REG2 connected to the input of the main memory MM. The main memory MM is write/read controlled by a signal R/W. When this signal equals "1" for example, a read is involved and when it equals "0", a write is involved. Furthermore, the memory is addressed by an address pointer ADD. Either a write-access or a read-access of the memory MM is performed at each cycle of the base clock signal MCK. Therefore, a read-access followed by a write-access of the memory is performed at each cycle of the first clock signal SMCK. The register REG2 stores the three data which will be written at the following clock cycle to the main memory MM.

The radix 4 stage also comprises an auxiliary processing means MTX. The auxiliary processing means MTX is connected to the output of the first main register REG1 for delivering as output a stream OUD of reconstructed data temporally delayed with respect to the input data INS. The auxiliary processing means MTX is associated with the auxiliary storage means comprising a single-access random access static auxiliary memory MMX. This memory is looped back to the auxiliary processing means MTX by a third auxiliary register or latch REG3 connected to the output of the auxiliary memory MMX, and by a fourth auxiliary register or latch REG4 connected to the input of the auxiliary memory MMX. This fourth auxiliary register REG4 is also connected to the input terminal of the stage to receive some of the data of the input flow directly, as discussed in greater detail below.

The auxiliary memory MMX is write/read controlled by the same signal R/W. Furthermore, the memory is addressed by the same address pointer ADD as that addressing the main memory MM. Thus, a read-access followed by a write-access of the auxiliary memory MMX is likewise performed at each cycle of the first clock signal SMCK. The storage capacity of the main storage of the processing stage is equal to 3N/4 data. In view of the two levels of pipeline, i.e., the two main registers REG1 and REG2, the storage capacity of the main memory MM is equal to N/4−1 words of three data while each register REG1, REG2 is able to store a word of three data. The main memory MM can therefore take the form of a matrix of N/4−1 rows and 3 columns.

The storage capacity of the auxiliary storage of the processing stage is equal to N/2 data. In view of the two levels of pipeline, i.e., the two auxiliary registers REG3 and REG4, the storage capacity of the auxiliary memory MMX is equal to N/4−1 words of two data while each auxiliary register REG3, REG4 is able to store one word of two data. The auxiliary memory MMX can therefore take the form of a matrix of N/4−1 rows and two columns. The main processing further comprises an adder/subtractor module MD1 to compute the intermediate data according to the formulas (I–IV) above, as well as a multiplier module MD2 for multipling these intermediate data by the appropriate coefficients W. The output of the multiplier module therefore delivers the output data stream OUS.

The four outputs 0, 1, 2, 3 of the module MD1 respectively deliver the intermediate data $A_i^{K^*}$, $A_{N/4+i}^{K^*}$, $A_{N/2+i}^{K^*}$, $A_{3N/4+i}^{K^*}$ of the four intermediate segments. The input terminal of the stage receiving the stream INS of input data, as well as the three outputs 1, 2, 3 of the first register REG1 are respectively connected to the four inputs 0, 1, 2, 3 of the adder module MD1. The input terminal of this stage is connected to the input 0 of a first four-input multiplexer MX1 whose three outputs are connected to the three inputs of the register REG2. The other three inputs 1, 2 and 3 of the first multiplexer MX1 are connected simultaneously to the three outputs 1, 2, 3 of the register REG1, and also to the three outputs 1, 2 and 3 of the module MD1. Output 0 of the module MD1 is linked to input 0 of a second multiplexer MX2 with four inputs whose output is connected to the input of the multiplier module MD2. The other three inputs 1, 2 and 3 of the second multiplexer are connected to the three outputs of the first register REG1.

The data of each input block are indexed by a first counter (write counter) WRC modulo N, which counts from 0 to N−1 at the frequency of the first clock signal SMCK, for example. Likewise, the output data are indexed from 0 to N−1 by a second counter (read counter) RDC modulo N, which likewise counts from 0 to N−1 at the frequency of the first clock signal. The rising to 1 of the first monitoring signal STBL indicates the reception of the first datum of the block, and reinitializes the counter WRC. The rising to 1 of the second monitoring signal STNX signals the transmission of the first output datum and reinitializes the read counter RDC. The second monitoring signal STNX passes to the 1 state when the first counter WRC reaches the value 3N/4−1.

The counter RDC controls the multiplexer MX2. More precisely, while the counter RDC is counting from 0 to N/4−1, the multiplier module MD2 will receive the value delivered by output 0 of module MD1. While the counter RDC is counting from N/4 to N/2−1, the module MD2 will receive the value available at output 1 of register REG1. While the counter RDC is counting from N/2 to 3N/4−1, the module MD2 will receive the value available at output 2 of register REG1. While the counter RDC is counting from 3N/4 to N−1, the module MD2 will receive the value available at output 3 of register REG1.

The values of the sines and cosines of the complex coefficients W, and the which values will be used in the module MD2 are stored in a read-only memory addressed by the read counter RDC, for example. The address signal ADD for the memory MM is delivered by a counter modulo N/4−1, and counts from 0 to N/4−2 at the frequency of the first clock signal SMCK. The counter modulo N/4−1 is not represented here for purposes of simplification.

The multiplexer MX1 is controlled by a control signal SC1 whose value depends on the counters WRC and RDC. In this regard, the processing stage comprises main control means MCE delivering the signal SC1 on the basis of the contents of the counters WRC and ADC. The various interconnections between the register REG2 and the various elements of the stage, via the multiplexer MX1, will be described in greater detail below. On the basis of this functional description, one skilled in the art will readily be able to construct the main control MCE from logic gates.

Referring to FIG. 4b, the auxiliary processing MTX comprises a module MDX which will, as described in greater detail below, reconstructs some of the data of the input block. This module MDX receives as input the outputs 2 and 3 from the register REG1, as well as the outputs from the third auxiliary register REG3. The output of the module MDX is connected to the auxiliary output terminal of the stage. That is, the output terminal delivers the reconstructed and temporally delayed data OUD of a fourth multiplexer MX4 controlled by a control signal SC4.

The two outputs of the register REG3 are connected to the two inputs of the register REG4 by a third multiplexer MX3. The register REG4 stores the data which will be delivered, at the following clock pulse, to the auxiliary memory MMX. The register REG4 is also capable of receiving, by the multiplexer MX3, some of the data of the input flow INS, as well as the data arising from the third output of the register REG1. The two outputs of the register REG3 are connected to the other two inputs of the multiplexer MX4.

The auxiliary processing also comprises an auxiliary control means MCX for delivering the two control signals SC3 and SC4 for the two multiplexers MX3 and MX4. These two signals SC3 and SC4 depend on the value of the counter WRC and of the counter RDC. The interconnections between the various elements illustrated in FIG. 4b, and consequently the control of these multiplexers, will be described below in greater detail, Similar to the main control means MCE, one skilled in the art will readily be able to construct the auxiliary control means MCX from logic gates. For simplification, the controls MCE and MCX have been represented separately in FIGS. 4a and 4b. However, they may be embodied within the same circuit.

Figure 5:
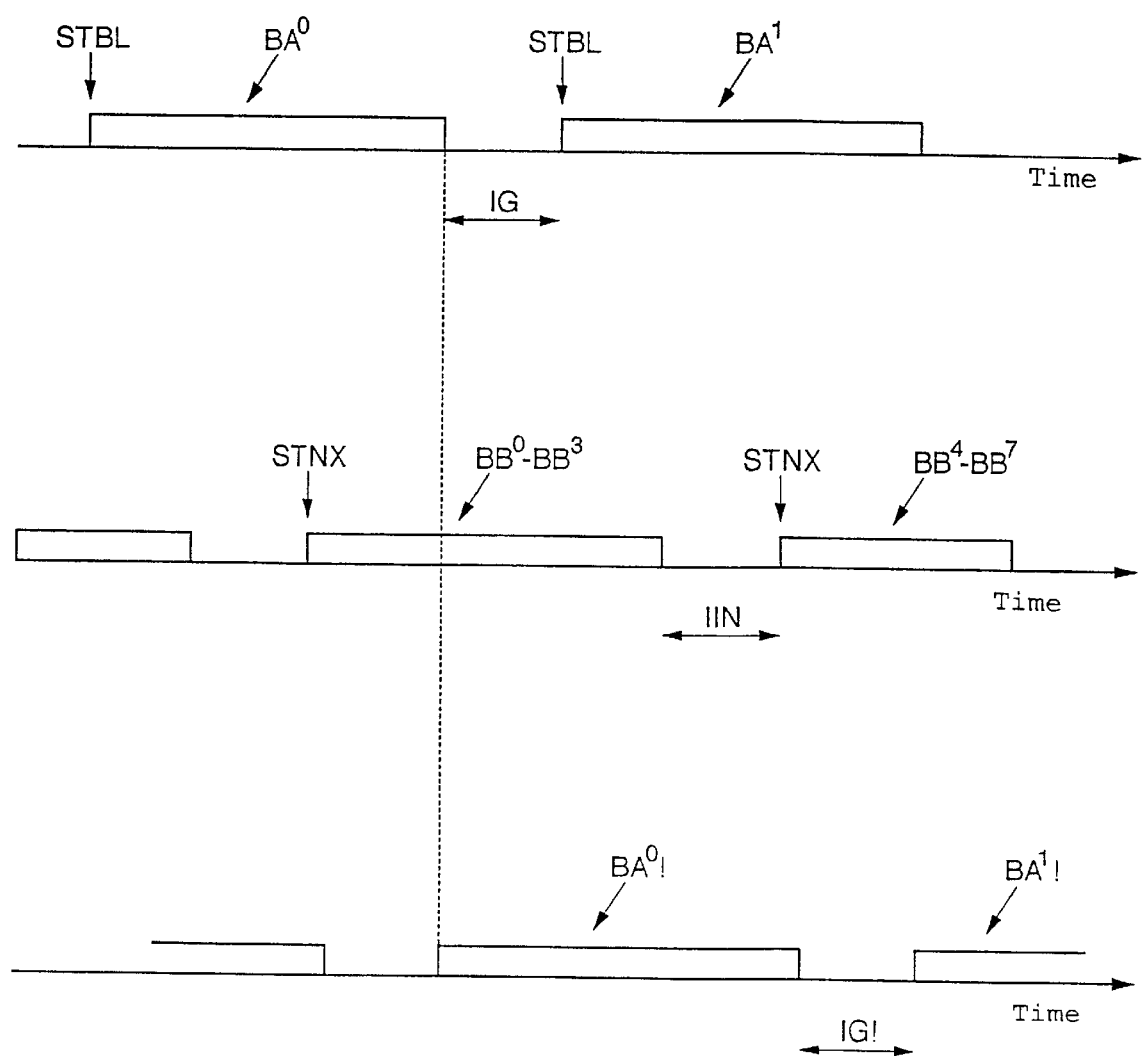
FIG. 5 illustrates schematically input and output data flows of the device taking into account a guard interval, as well as a reconstructed output flow, according to the present invention.

The address signal ADD for the auxiliary memory MMX is also delivered by the same counter modulo N/4−1, which counts from 0 to N/4−2 at the frequency of the first clock signal SMCK. In some applications, especially in digital television receivers, the various symbols received as input to the computing device DF are spaced apart by a guard interval IG, as shown in FIG. 5. The guard interval IG consists of a greater or lesser number Ng of data, which are generally the duplicate of terminal data of the symbol following the guard interval.

FIG. 5 illustrates the stream of a symbols received by the input stage ET0 with radix 4. Each symbol is a block of sixteen data. The top part of FIG. 5 represents the first two blocks received $BA^0$, $BA^1$. They are separated by the guard interval IG, and whose first respective data are identified by the rising to 1 of the signal STBL. The guard interval IG is therefore, the duplicate of the terminal data of block $BA^1$. The middle part of FIG. 5 illustrates the corresponding output blocks BB. Thus, the blocks $BB^0$–$BB^3$ tagged by the signal STNX correspond to block $BA^0$, while blocks $BB^4$–$BB^7$ correspond to block $BA^1$. Block $BB^4$ is separated from block $BB^3$ by data IIN, which has been computed with the guard interval and therefore has no physical significance.

The bottom part of FIG. 5 illustrates the stream of reconstructed symbols temporally delayed relative to the stream of input symbols, and delivered by the output OUD of the processing stage. In the remainder of the text, the sign "!" associated with a datum or with a block denotes this datum or this block temporally delayed. In the bottom part of this figure, the two reconstructed blocks $BA^0$! and $BA^1$! remain mutually separated by the guard interval IG! corresponding to the guard interval IG. As will be discussed in greater detail below, the guard interval is simply delayed but is not recomputed like some of the data of the blocks. Temporally, the delayed interval IG! is delivered simultaneously with the terminal part of the block $BA^1$. This furnishes a correlation peak after correlation using sliding correlation.

Figure 4A:
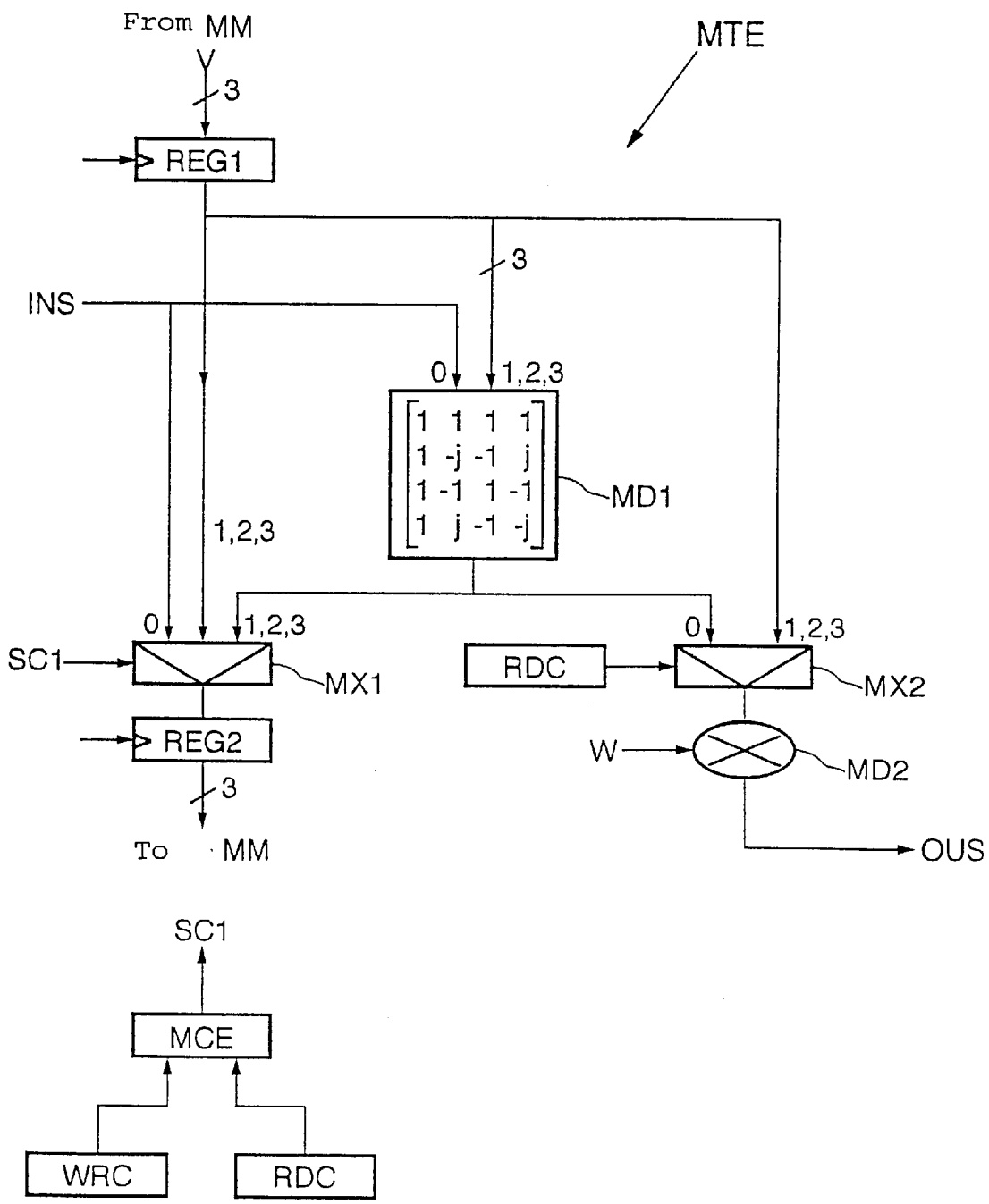

The mode of operation of the processing of this stage, as well as the filling of the various memories, will now be described in greater detail while referring more particularly to FIGS. 4a and 4b. It is assumed that the memory MM contains the data $A_i^K$, $A_{N/4+i}^K$, and $A_{N/2+i}^K$ of the first three segments of the block K, which have been stored as they are received. That is, as the counter WRC counts from 0 to 3N/4−1. In the remainder of the text, the index q denotes for simplification, the sum i+Ng modulo N/4, where Ng is the number of data of the guard interval IG.

Generally, while the counter WRC is counting from 3N/4 to N−1, the stage receives in succession as input the data $A_{3N/4+i}^K$ of the fourth segment of the block. However, these data are not store in the memory MM and are used with the counterpart data of the first three segments to compute the intermediate data $A_i^{K*}$, $A_{N/4+i}^{K*}$, $A_{N/2+i}^{K*}$ and $A_{3N/4+i}^{K*}$ of the four intermediate segments. However, the intermediate data $A_i^{K*}$ of the first intermediate segment are not stored in the main memory MM and are forwarded directly to the multiplier Module MD2.

In contrast, as the data of the fourth segment of the block K are received, the data stored in the main memory MM are replaced respectively by the intermediate data computed by the module MD1. The data stored in the main memory MM relates to the first three segments of the block K. The intermediate data computed by the module MD1 relate to the last three intermediate segments. Furthermore, as the data of the fourth segment of the block K are received, the auxiliary memory stores the data of the third segment which was stored in the main memory MM, and stores the incoming data of the fourth segment.

The manner of operation will now be described below phase by phase.

Phase 1: The value of the counter WRC is equal to 3N/4 and that of the counter RDC is zero. The third output of the register REG1 is connected to the first input of the register REG4 to store therein the datum $A_{N/2}^K$. Input 2 of the register REG4 is then connected to the input terminal of the stage and receives the datum $A_{3N/4}^K$. Outputs 1 and 2 of the register REG3 contain the data $A_{N/2+Ng}^{K-1}$ and $A_{3N/4+Ng}^{K-1}$ respectively. Output 2 of the register REG3 is then connected to the output terminal OUD to deliver the reconstructed and temporally delayed datum $A_{3N/4+Ng}^{K-1}$!.

Phase 2: The counter WRC counts from 3N/4+1 to N−1, the counter RDC counts from 1 to N/4−1, and i varies from 1 to N/4−1 at the frequency of the counter WRC. This time it is the first output of the auxiliary register REG3 which is connected to the delayed output OUD to deliver the datum of the guard interval $G_q^{K-i}$. The second output of the register REG3 contains the datum $A_{3N/4+q}^{K-1}$.

Phase 3: The counter WRC counts from 0 to N/4−1, the counter RDC counts from N/4 to N/2−1, and i varies from 0 to N/4−1 at the frequency of the counter WRC. In this phase, the reinitializing of the counter WRC to zero corresponds to the value N modulo N of this counter. The data $G_i^K$ of the guard interval is then received at the input of the processing stage. The data $G_i^K$, which follow block K, are the duplicate of the end of block K+1.

The outputs 1, 2, 3 of register REG1 deliver the intermediate data $A_{N/4+i}^{K*}$, $A_{N/2+i}^{K*}$ and $A_{3N/4+i}^{K*}$ respectively. Outputs 2 and 3 of register REG1 are connected to inputs 2 and 3 of register REG2 to store therein the corresponding data. In contrast, input 1 of register REG2 is connected to the input INS of the stage to receive the guard data $G_i^K$. The word ($A_{N/2+i}^K$, $A_{3N/4+i}^K$) is read from register REG3 and redelivered to register REG4.

The auxiliary reconstruction module reconstructs the temporally delayed datum $A_i^K$! based on formula (V) below $$A_i^K = (A_{N/2+i}^{K*} + A_{3N/4+i}^{K*})/2 + A_{N/2+i}^K. \tag{V}$$

This delayed datum $A_i^K$! is delivered to the auxiliary output OUD. At a given moment, the counter WRC will be reinitialize to zero while receiving the datum $A_i^{K+1}$ of the following block K+1. The value of i is then likewise reinitialized to 0. In contrast, the counter RDC will, for its part, not yet have reached the value N/2. Everything just described for phase 3 remains valid with regards to the other data in replacing the datum $G_i^K$ by $A_i^{K+1}$, and in replacing the index i by the index q. Furthermore, the auxiliary reconstruction module then delivers the temporally delayed datum $A_q^{K!}$.

Phase 4: The counter WRC is again in its phase of counting from 0 to N/4−1, but the counter RDC now counts from N/2 to 3N/4−1. The word $(G_q^K A_{N/2+q}^{K*}, A_{3N/4+q}^{K*})$ is read from register REG1. The word $(A_i^{K+1}, G_q^K, A_{3N/4+q}^{K*})$ is written to register REG2. The last two data of this word originate from register RRC1, while the first datum originates from the input stream. The word $(A_{N/2+q}^K, A_{3N/4+q}^K)$ is read from register REG3 and stored again in register REG4. The datum $A_{N/4+q}^K!$ is reconstructed in the reconstruction module MDX based on formula (VI)

$$A_{N/4+q}^K = j\ (A_{N/2+q}^{K*} - A_{3N/4+q}^{K*})/2 + A_{3N/4+q}^K. \tag{VI}$$

The storage locations of the data of the guard interval have started shifting one column to the right in the main memory.

Phase 5: The counter WRC now counts from N/4 to N/2−1, the counter RDC still counts from N/2 to 3N/4−1, and i varies from 0 to N/4−1 at the frequency of the counter WRC. The word $(A_i^{K+1}, A_{N/2+q}^{K*}, A_{3N/4+q}^{K*})$ is read from register REG1. The word $(A_i^{K+1}, A_{N/4+i}^{K+1}, A_{3N/4+q}^{K*})$ is stored in register REG2. The second datum of this word originates directly from the input stream, while the other two data originate from register REG1. Register REG3 is still connected directly to register REG4. More precisely, the word $(AN_{/2+q}^K, A_{3N/4+q}^K)$ is read from register REG3 and stored again in register REG4. The auxiliary reconstruction module reconstructs, according to formula (VI), the temporally delayed datum $AN_{/4+q}^K!$ and delivers it to the auxiliary output OUD.

Phase 6: The counter WRC is still in its phase of counting from N/4 to N/2−1 (i has not been reinitialized to 0), and the counter RDC counts from 3N/4 to N−1. The word $(A_i^{K+1}, G_q^K A_{3N/4+q}^{K*})$ is read from register REG1. The word $(A_i^{K+1}, A_{N/4+i}^{K+1}, G_q^K)$ is stored in register REG2. The second datum of this word still originates from the input stream, while the other two data again originate from register REG1. The shifting of the data of the guard interval one column to the right is continued here. The auxiliary registers RPC and REG4 are still mutually directly connected. More precisely, the word $(A_{N/2+q}^K, A_{3N/4+q}^K)$ is read from register REG3 and stored in register REG4. In contrast, the first output of register REG3 is connected directly to the output OUD to deliver the temporally delayed datum $A_{N/2+q}^K!$. This reconstructed datum has not been recomputed but has simply been extracted from the auxiliary memory.

Phase 7: The counter WRC counts from N/2 to 3N/4−1, i varying from 0 to N/4−1 at the frequency of this counting, and the counter RDC still counts from 3N/4 to N−1. The word $(A_i^{K+1}, A_{N/4+i}^{K+1}, A_{3N/4+q}^{K*})$ is read from register REG1. The word $(A_i^{K+1}, A_{N/4+i}^{K+1}, A_{N/2+i}^{K+1})$ is stored in register REG2. The first two data originate from register REG1, while the third datum of this word originates directly from the input stream. The two auxiliary registers REG3 and REG4 are directly mutually connected. More precisely, the word $(A_{N/2+q}^K, A_{3N/4+q}^K)$ is read from register REG3 and stored in register REG4. The first output of register REG3 is connected directly to the output OUD delivering the temporally delayed datum $A_{N/2+q}^K!$.

Phase 8: The counter WRC is still in its phase of counting from N/2 to 3N/4−1 (i has not been reinitialized to 0), but the counter RDC now counts from 0 to N/4−1 since it has been reinitialized automatically to 0 after the value N−1. The word $(A_i^{K+1}, A_{N/4+i}^{K+1}, G_q^K)$ is read from register REG1, The word $(A_i^{K+1}, A_{N/4+i}^{K+1}, A_{N/2+i}^{K+1})$ is stored in register REG2. The first two data of this word originate from register REG1, while the third datum originates directly from the input stream.

Furthermore, the datum of the guard interval of $G_q^K$ (output No. 3 of register REG1) is delivered at input 1 of register REG4, while input 2 of register REG4 receives the datum present at output 2 of register REG3, i.e. $A_{3N/4+q}^K$. The datum read at output 1 of register REG3 is the datum $A_{N/2+q}^K$. This time it is output 2 of register REG3 which is connected directly to the delayed output OUD. The datum of the guard interval has been transferred into the auxiliary storage before being extracted therefrom subsequently.

On completion of this phase, the main memory MM again contains the data of the first three segments of block K+1 and a new complete write/read cycle can begin (phase 1). The value $N_g$ need not be known a priori, inasmuch as in this example it remains less than N/4. It is solely on the basis of the transitions 0, N/4, N/2 and 3N/4 of the counters WRC and RDC that the various control signals for the various multiplexers are derived. Finally, because addressing of the main memory and of the auxiliary memory is controlled on the basis of the same address counter, the hardware construction of the memory plane is significantly simplified.

Figure 6A:
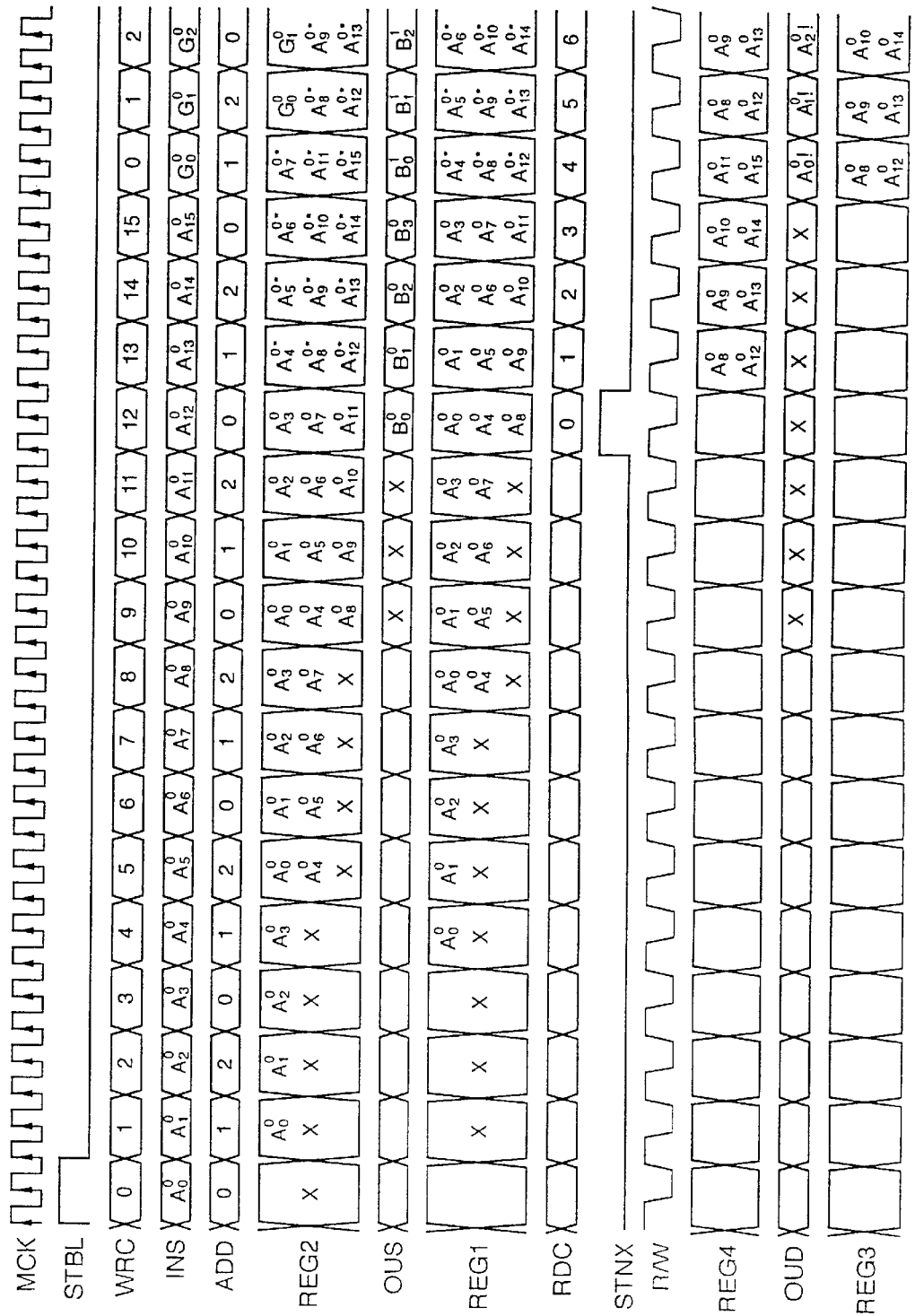
FIGS. 6a and 6b are timing diagrams illustrating a particular case of the operation of a device taking into account a guard interval between the various symbols to be processed, according to the present invention.
Figure 6B:
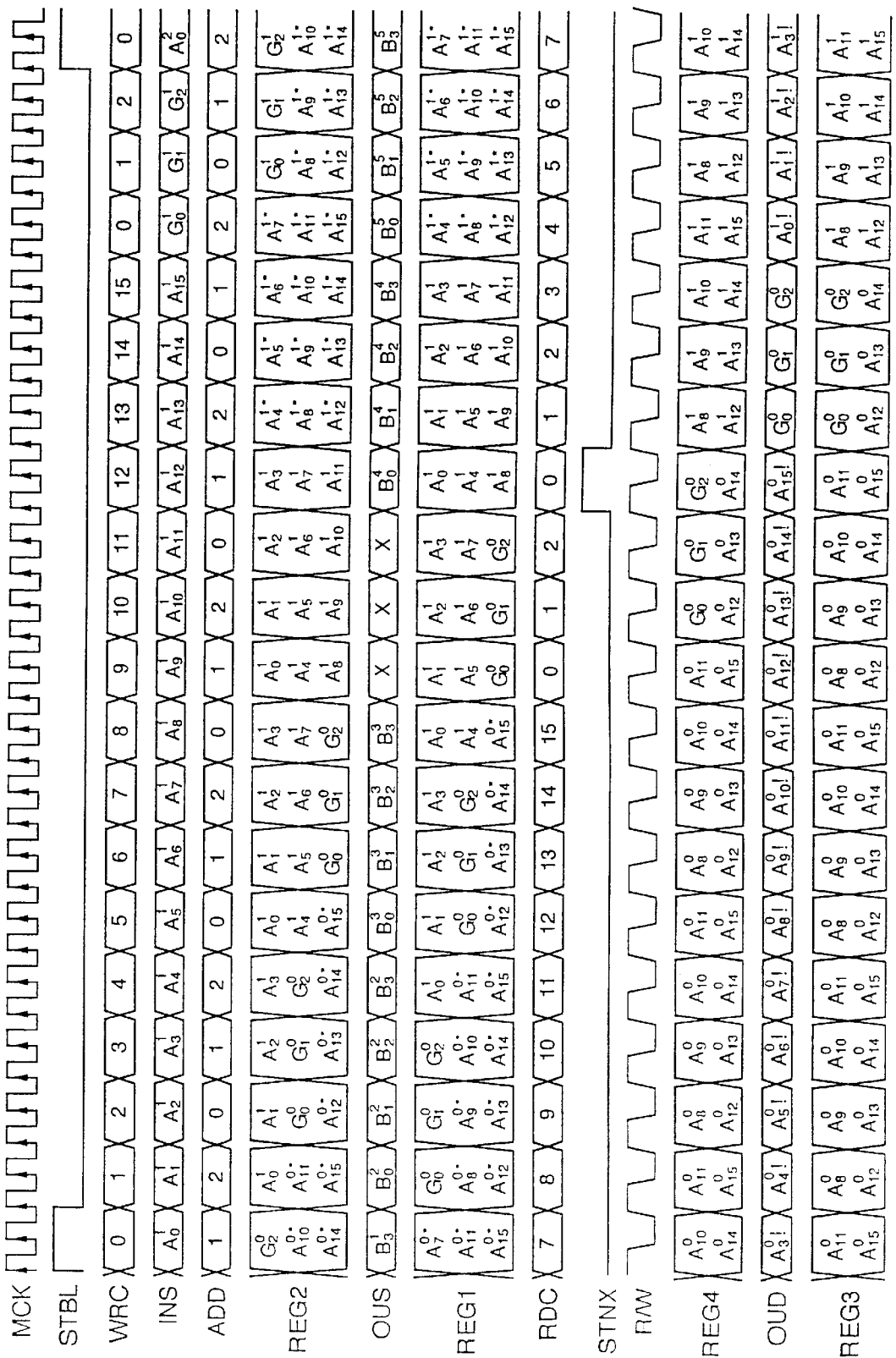

FIGS. 6a and 6b represent the timing diagram corresponding to the processing of blocks $BA^0$ and $BA^1$ in the input stage, in accordance with the mode of operation described earlier. In these figures, the lines REG2 and REG4 represent the valid contents output by these registers. This explains the rightward shift by one clock cycle relative to the value of the counter WRC. The first counting cycle of the counter WRC from 0 to 15 (FIG. 6a) corresponds to an initial phase of filling the main memory MM. Finally, in this example, Ng=3.

Everything just described generalizes to electronic devices for computing Fourier transforms of large initial size. Thus, in digital television applications in which it is necessary to perform 8,192 point Fourier transforms, six radix 4 stages are provided, followed by a conventional radix 2 terminal stage. If dual-access memories are used instead of single-access memories, the frequency of the clock signal SMCK would equal the frequency of the clock signal SMCK if the imaginary and real parts of each datum are received at each cycle of the signal SMCK. The read address of the memories MM and MMX would then equal the write address minus 1.

That which is claimed is:

1. A method for controlling a radix 4 processing stage of device heaving a pipelined architecture for computing a Fourier transform, the method comprising the steps of:

receiving at least one input block comprising N data bits;

storing 3N/4 data bits of the at least one input block in main storage comprising a random access memory;

storing N/2 data bits of the at least one input block in auxiliary storage comprising a random access memory;

performing a Fourier transform on the 3N/4 stored data bits and on a remaining N/4 data bits of the at least one input block; and reconstructing the N data bits of the at least one input block from the 3N/4 data bits and the N/2 data bits respectively stored in the main and auxiliary storages to generate a reconstructed data block temporally delayed with respect to the at least one input block.

2. A method according to claim 1, wherein receiving comprises sequentially receiving the N data bits of the at least one input block;

wherein the method further comprises ordering the N data bits of the at least one input block within four consecutive segments, each segment comprising N/4 data bits, each datum of a segment forming a group of four data bits together with a counterpart data bit of the other three segments;

wherein storing 3N/4 data bits comprises storing data contained in a first three segments in the main storage as the N data bits of the at least one input block are received, wherein storing N/2 data bits comprises storing data contained in a third and fourth segment in the auxiliary storage responsive to receiving data bits for the fourth segment; and wherein performing a Fourier transform comprises processing the group of four data bits using a butterfly operation to derive successive groups of four intermediate data bits ordered respectively within four consecutive intermediate segments; and replacing data stored in the main storage by a respective intermediate data contained in a last three intermediate segments.

3. A method according to claim 2, wherein reconstructing comprises:

reconstructing data contained in a first two segments by recomputing the data; and reconstructing data contained in a last two segments by storing the data temporarily in the auxiliary storage before removing the data therefrom.

4. A method according to claim 1, wherein the step of receiving at least one input block comprises receiving two successive input blocks separated by at least one guard interval, the at least one guard interval comprising guard data.

5. A method according to claim 4, further comprising storing the guard data of the at least one guard interval in succession in the main memory as the guard data are received; and further comprising the following when a first input block of the two successive input blocks are received:

performing successive shifts of a respective storage location of the guard data;

removing the guard data in succession from the main storage;

storing the guard data in succession in the auxiliary storage; and wherein reconstructing comprises removing in succession the guard data from the auxiliary storage to retrieve a temporally delayed guard interval separating two successive reconstructed blocks temporally delayed with respect to the two successive input blocks.

6. A method according to claim 5, wherein performing successive shifts and storing the guard data are performed responsive to receiving data bits contained in the first three segments of the input block.

7. A method for controlling a radix 4 processing stage for computing a Fourier transform in a device using orthogonal frequency division multiplex (OFDM) coding, the method comprising:

receiving two successive input blocks separated by at least one guard interval, the at least one guard interval comprising guard data and each input block comprising N data bits;

storing 3N/4 data bits of each input block in a main storage comprising a random access memory;

storing N/2 data bits of each input block in an auxiliary storage comprising a random access memory;

performing a Fourier transform on the 3N/4 stored data bits and on a remaining N/4 data bits of each input block; and reconstructing the N data bits of each input block from the 3N/4 data bits and the N/2 data bits respectively stored in the main and auxiliary storages to generate a reconstructed data block temporally delayed with respect to the two successive input blocks.

8. A method according to claim 7, further comprising storing the guard data of the at least one guard interval in succession in the main memory as the guard data are received; and further comprising the following when a first input block of the two successive input blocks are received:

performing successive shifts of a respective storage location of the guard data;

removing the guard data in succession from the main storage;

storing the guard data in succession in the auxiliary storage; and wherein reconstructing comprises removing in succession the guard data from the auxiliary storage to retrieve a temporally delayed guard interval separating two successive reconstructed blocks temporally delayed with respect to the two successive input blocks.

9. A method according to claim 8, wherein performing successive shifts and storing the guard data are performed responsive to receiving data bits contained in the first three segments of the input block.

10. An electronic device having a pipelined architecture for computing a Fourier transform, the electronic device comprising:

at least one processing stage with a radix equal to 4 receiving successive input blocks, each input block comprising N data bits, said at least one processing stage comprising a main storage circuit having a storage capacity equal to 3N/4 data bits, an auxiliary storage circuit having a storage capacity equal to N/2 data bits, a main processor performing a Fourier transform of elementary size equal to 4 on 3N/4 data bits stored in said main storage circuit and on a remaining N/4 data bits corresponding to an input block, and an auxiliary processor for reconstructing the N data bits of the input block from the 3N/4 data bits and N/2 data bits respectively stored in said main and auxiliary storage circuits for generating a reconstructed data block temporally delayed with respect to the input block.

11. An electronic device according to claim 10, wherein said main processor respectively performs N/4 butterfly processing operations on N/4 distinct groups of four data bits for each input block processed by said at least one processing stage.

12. An electronic device according to claim 11, wherein said main storage circuit comprises a main memory, and n main registers connected with said main memory, said main memory for storing (N/4)−(n−1) words of three data bits, each of said n main registers for storing 1 word comprising three data bits; and wherein said auxiliary storage circuit comprises an auxiliary memory, and n auxiliary registers mutually connected in series with said auxiliary memory, said auxiliary memory for storing (N/4)−(n−1) words of two data bits, each of said n auxiliary registers for storing 1 word comprising two data bits.

13. An electronic device according to claim 12, wherein said main and auxiliary memories each comprises a random access memory.

14. An electronic device according to claim 10, wherein said at least one processing stage further comprising an input for sequentially receiving the N data bits of a current input block at a frequency of a first clock signal, the N data bits being ordered within four consecutive segments each comprising N/4 data bits, each datum of a segment forming a group of four data bits together with a counterpart data bit of the other three segments.

15. An electronic device according to claim 14, wherein said main processor comprises an adder/subtractor module for performing at each cycle of the first clock signal a butterfly processing operation on each group of four data bits formed for deriving successive groups of four intermediate data bits respectively ordered within four consecutive intermediate segments, and a multiplier module for multiplying at each cycle of the first clock signal the intermediate data by predetermined multiplier coefficients; and wherein said auxiliary processor comprises an auxiliary reconstruction module for recomputing data of the input block contained in a first and second segment.

16. An electronic device according to claim 15, further comprising:

main control circuit for providing to said main storage circuit data contained in a first three segments as the data are received, and for replacing data stored in said main storage circuit by intermediate data contained in a last three intermediate segments as data contained in a fourth segment are received; and auxiliary control circuit for providing to said auxiliary storage circuit data contained in a third and fourth segment, and for removing the data therefrom to reconstruct the data contained in the third and fourth segments.

17. An electronic device according to claim 16, wherein said main storage circuit comprises a first and a second main register; and wherein said main processor comprises:

a first and a second controllable multiplexer;

an adder/subtractor module;

a multiplier module; and wherein said first main register is connected to an output of said main storage circuit, an output of said first main register being connected to an input of said second main register by said first controllable multiplexer, the output of said first main register being connected to an input of said adder/subtractor module, the output of said first main register is connected to an input of said multiplier module by said second controllable multiplexer, said second main register being connected to an input of said main storage circuit, the output of said adder/subtractor module being connected to the input of said first main register by said first multiplexer and to the input of said multiplier module by said second multiplexer.

18. An electronic device according to claim 17, wherein said auxiliary storage circuit comprises a third and a fourth auxiliary register; and wherein the electronic device further comprises:

a third and fourth controllable multiplexer;

an auxiliary reconstruction module; and wherein said third auxiliary register is connected to an output of said auxiliary storage circuit, said fourth auxiliary register being connected to an input of said auxiliary storage circuit, said third controllable multiplexer being connected to an input terminal of said input stage, an output of said third auxiliary register being connected to an input of said fourth auxiliary register by said third controllable multiplexer, the output of said third auxiliary register being connected to the output of said first main register, the output of said third auxiliary register being connected to an input of said auxiliary reconstruction module and to an input of said fourth controllable multiplexer for delivering reconstructed and delayed data, an input of said auxiliary module being connected to the output of said first main register, an output of said auxiliary reconstruction module being connected to the input of said fourth multiplexer.

19. An electronic device according to claim 18, wherein said main control circuit and said auxiliary control circuit further comprising:

a first, a second, a third and a fourth multiplexer;

a first counter modulo N being clocked by the first clock signal for reinitializing on reception of a first datum of each input block;

a second counter modulo N clocked by the first clock signal for reinitializing on transmission of a first output datum from said at least one processing stage;

a control module for delivering control signals for said first through fourth multiplexers on count values provided by said first and second counter modules; and wherein said main and auxiliary processor comprises common means for addressing said main storage circuit and said auxiliary storage circuit comprising a counter modulo N/4−1.

20. An electronic device according to claim 10, wherein the input block comprises two successive input blocks separated by a guard interval comprising guard data, said main processor comprises shift means for performing successive shifts of a respective storage location of the guard data in said main storage circuit.

21. An electronic device according to claim 20, wherein said shift means comprises a second multiplexer.

* * * * *

UNITED STATES PATENT AND TRADEMARK OFFICE
CERTIFICATE OF CORRECTION

PATENT NO. : 6,324,561 B1
DATED : November 27, 2001
INVENTOR(S) : Cambonie

It is certified that error appears in the above-identified patent and that said Letters Patent is hereby corrected as shown below:

Column 1,
Line 7, delete "more particularly, At to" insert -- more particularly, to --

Column 3,
Line 66, delete "bite" insert -- bits --

Column 5,
Line 41, delete "vectors, These automatic teat" insert -- vectors. These automatic test --

Column 9,
Line 56, delete "multipling" insert -- multiplying --

Column 12,
Line 7, delete "Module" insert -- module --

Column 13,
Line 42, delete "hag" insert -- has --

Signed and Sealed this

Twenty-fifth Day of June, 2002

*Attest:*

JAMES E. ROGAN
*Director of the United States Patent and Trademark Office*

*Attesting Officer*